United States Patent
Van Den Beukel et al.

(10) Patent No.: US 10,477,832 B2
(45) Date of Patent: Nov. 19, 2019

(54) AUTONOMOUS SELF-PROPELLED MANURE REMOVAL VEHICLE

(71) Applicant: Lely Patent N.V., Maassluis (NL)

(72) Inventors: Huibrecht Johannes Arjen Van Den Beukel, Maassluis (NL); Harrold Jan Munneke, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 281 days.

(21) Appl. No.: 15/307,406

(22) PCT Filed: Apr. 21, 2015

(86) PCT No.: PCT/NL2015/050263
§ 371 (c)(1),
(2) Date: Oct. 28, 2016

(87) PCT Pub. No.: WO2015/170967
PCT Pub. Date: Nov. 12, 2015

(65) Prior Publication Data
US 2017/0042115 A1    Feb. 16, 2017

(30) Foreign Application Priority Data

May 8, 2014 (NL) ..................................... 2012785

(51) Int. Cl.
*A01K 1/01* (2006.01)
*A47L 11/40* (2006.01)

(52) U.S. Cl.
CPC .............. *A01K 1/0128* (2013.01); *A01K 1/01* (2013.01); *A47L 11/4011* (2013.01); *A47L 11/4061* (2013.01); *A47L 11/4072* (2013.01); *A01K 1/0132* (2013.01); *A47L 2201/04* (2013.01)

(58) Field of Classification Search
CPC ...... A01K 1/0128; A01K 1/01; A01K 1/0132; A47L 11/4072; A47L 11/4011; A47L 11/4061; A47L 2201/04; A47L 2201/00
See application file for complete search history.

(56) References Cited

U.S. PATENT DOCUMENTS

2006/0180089 A1   8/2006  Van Den Berg
2011/0296635 A1  12/2011  Van Meurs et al.
2014/0124000 A1   5/2014  Hillforth et al.

FOREIGN PATENT DOCUMENTS

EP       1 690 450 A1    8/2006
WO    2010/095930 A1    8/2010
WO    2013/010785 A1    1/2013

OTHER PUBLICATIONS

International Search Report dated Sep. 23, 2015 in PCT/NL2015/050263 filed Apr. 21, 2015.

*Primary Examiner* — David Redding
(74) *Attorney, Agent, or Firm* — Oblon, McClelland, Maier & Neustadt, L.L.P.

(57) ABSTRACT

A self-propelled manure removal vehicle, including: at least two wheels, at least one motor device and a control device, for displacing the vehicle by driving at least one of the wheels; a floor-scraping device configured to clean a floor surface while being in contact with the floor surface, wherein at least a lower rim of the floor-scraping device is flexible to adapt its shape to the floor surface; and at least one skid element including a lower rim with a slide surface to slide over a floor surface to support the vehicle, and the lower rim of the floor scraping device projects further downwardly than the slide surface of the at least one skid element.

19 Claims, 4 Drawing Sheets

AUTONOMOUS SELF-PROPELLED MANURE REMOVAL VEHICLE

The present invention relates to an autonomous self-propelled manure removal vehicle. Such manure removal vehicle is for example disclosed in WO 2013010785 A1.

The vehicle of WO 2013010785 A1 comprises at least two wheels, at least one motor and a control device, for displacing the vehicle in a desired direction of travel by driving at least one of the wheels, a tank for storing manure having a manure inlet opening, a vacuum pump which is connected to the control device and designed to apply a reduced pressure to the tank via the air discharge, and a manure-collecting device having a floor-scraping device, wherein the manure inlet opening, viewed in the intended direction of travel, is situated in front of the floor-scraping part and is at least partly surrounded by the floor-scraping part.

The manure removal device of WO 2013010785 A1 is supported at the front side by the floor scraping device or a castor wheel.

A drawback of using the floor scraping device as front support element, is that the floor scraping device has to be relatively stiff to transfer the support forces of the front side of the vehicle. At the same time, it is desirable that the floor scraping device is flexible to adapt its shape to the floor surface which may not completely flat.

A drawback of using a castor wheel is that the castor wheel may easily be contaminated by dirt, in particular manure. Furthermore, a drawback of the castor wheel is that it comprises movable parts that are susceptible to wear and contamination in the extremely soiled stable environments where it will be used.

It is an object of the invention to provide a self-propelled manure cleaning vehicle which is properly supported at its front side, and at the same time provides an effective cleaning of the floor surface, in particular an effective scraping of manure from the floor surface.

The invention provides an autonomous self-propelled manure removal vehicle as claimed in claim 1, in particular an autonomous self-propelled manure removal vehicle, comprising at least two wheels each having an axis of rotation, at least one motor device and a control device, for displacing the vehicle by driving at least one of the wheels, a floor-scraping device having at least a flexible lower scraper rim to adapt its shape to the floor surface, the floor-scraping device being configured to clean, in a working state of the vehicle, a floor surface while being in contact with the floor surface, wherein the vehicle comprises at least one skid element having at least a flexible lower skid rim with a slide surface to slide over a floor surface to support the vehicle in the working state of the vehicle, the at least one skid element being elongate and extending substantially perpendicular to the axes, and wherein the lower scraper rim of the floor scraping device in a non-loaded and non-working resting state of the vehicle extends further downwardly than the slide surface of the at least one skid element. Herein, the working state is when the vehicle is being displaced over the floor to remove manure therefrom, and the non-loaded and non-working resting state is when the vehicle is standing still and is not loaded. In such a case, the flexible lower rims will not be bent or flexed, and will be substantially vertical, due to their inherent elasticity (restoring force). In the extreme case, when the vehicle would be lifted from the floor, the lower rims will certainly be straight. Then, in this non-working resting state, the lower scraper rim of the floor scraping device projects below the slide surface of the at least one skid element. All this is to ensure that in the working state, the lower skid rim will be straight and support the vehicle when the vehicle moves substantially straight ahead, i.e. parallel to the skid surface, even when the lower scraper rim will flex to follow the floor and thus no longer be able to support the vehicle well. Furthermore, when the vehicle needs to turn to the left or right, the lower skid rim, which is flexible, is able to flex and thus cause less resistance when sliding transversely across the floor. Note that in such a case the lower scraper rim may provide more support to the vehicle, especially when the turn is such as to make the vehicle move parallel to (part of) the scraper rim. Furthermore, By this combination of a flexible floor scraping device and the at least one skid element, the front of the vehicle may be properly supported and the floor can effectively be cleaned by the floor scraping device, as the floor scraping device can be optimized for cleaning of the floor surface.

The at least one skid element comprises a flexible lower skid rim with a slide surface configured to slide over a floor surface. The lower skid rim, or the slide surface thereof, may be made of any suitable material. In one embodiment, the at least one skid element may be completely made of one material, but in other embodiments the at least one skid element may have a separate suitable material that is used as the lower skid rim, or the slide surface thereof. A similar set-up holds for the floor-scraping device, which may be made out of one material, or the lower scraper may be made of a separate material.

The use of at least one skid element is advantageous to support the vehicle, since the presence of manure does not have a substantial negative effect on the functioning of the skid element, in particular since the at least one skid element does not have any moving parts.

In the working state, the at least one skid element appears stiff in the vertical direction compared with at least the bottom end of the floor scraping device, because it would have to bend in a direction along its length instead of perpendicularly thereto. As a result, the at least one skid element can be used to maintain the vehicle in a balanced position in which the vehicle is supported on the wheels and the at least one skid element. For example, the at least one skid element and the floor scraping device may be made of the same material, for example polyurethane (PUR), but the at least one skid element may be made of thicker material than the floor scraping device. Preferably, the skid elements are made of a material having low friction and high wear resistance.

Since the floor scraping device projects below the slide surface of the at least one skid element, the floor scraping device can deform to adapts its shape to the floor surface over which the vehicle is driven and can also reach into lower areas, such as pits or holes of the floor surface.

The vehicle is an autonomous self-propelled vehicle. The vehicle may autonomously move over a floor surface, i.e. the vehicle does not require a human driver to drive and/or steer the vehicle. The vehicle may be programmed to follow a driving route or may be programmed to autonomously decide on a driving route.

The at least one skid element is elongate and extends substantially perpendicular to the axes of rotation of the at least two wheels. By arranging the slide surface in this direction, the stability of the at least one skid element is achieved. Herein, "substantially perpendicular" means at an angle of at least 80° to the axes.

In embodiments, the lower scraper rim and the lower skid rim are arranged to flex independently from one another, and in particular are separate from one another. In this way, the advantageous flexing properties of both the lower scraper rim and the lower skid rim may be optimally used, and different materials are possible to further optimize these parts. However, the scraper and the skid element may be unitary, with an incision or the like between said rims to allow the independent flexing. The lower scraper rim and the lower skid rim may also be separate parts altogether, which allows even more design freedom for the parts, their mounting and so on. In an embodiment, the vehicle comprises two skid elements each configured to slide over a floor surface to support the vehicle, in particular two such skid elements, each configured to slide over a floor surface to support the vehicle in the working state of the vehicle. In some embodiments, it is advantageous to use two skid elements that are arranged at the front of the vehicle at opposite sides thereof. This provides stability while not (or the least) interfering with the task(s) of the vehicle. In an alternative embodiment, one skid element having one or more sliding surfaces may be applied.

In an embodiment, the two skid elements are arranged adjacent to and in front of the floor-scraping device to form a manure collection space delimited by the floor-scraping device and the two skid elements. Herein, the skid elements may be an integral part of the manure collection space. The manure collection space can be used to collect a quantity of manure and displace this quantity of manure over the floor surface. Such displacement will when executed on a slatted floor over a manure cellar, cause the manure to be pushed through the openings between the floor parts into the manure cellar. The collected manure can also be sucked into a manure collection tank, typically this will be advantageous when used on closed floors. It is to be noted that the type of material collected with the vehicle is not particularly limited, although it is intended to collect semi-liquid, viscous material lying on a floor, in particular manure.

In an embodiment, the two skid elements (10) are arranged substantially adjacent opposite ends of the floor-scraping device (9). By arranging the two skid elements close to the opposite ends of the floor scraping device, the manure collection space formed by the floor scraping device and the skid elements substantially extends over the width of the floor scraping device, and collected manure can not leak away at the ends of the floor-scraping device. The floor-scraping device preferably also extends over substantially the width of the vehicle, but at least over the width between the outer contours of the wheels of the vehicle, such that the wheels normally travel over a cleaned floor surface, and the scraper is able to remove manure close to a wall or the like. Furthermore, herein "substantially adjacent" is intended to mean the skid elements abut to the floor scraping device such that in use, i.e. with one or more flexed lower rims, leakage of the collected manure out of the manure collecting space is substantially prevented. For example, in the unloaded resting state, the floor-scraping device, in particular its lower rim, and the skid element, in particular its lower rim, may abut, although depending on the viscosity of the manure, a slit of some width is possible.

In an embodiment, the floor-scraping device projects, at opposite sides of the vehicle, beyond the skid element provided at a respective end of the floor-scraping device.

The floor scraping device may project beyond the skid elements such that a free end of the floor scraping device projects outwards from the sides of the vehicle. This free end of the floor-scraping device can be used to scrape a part of a side wall and/or a floor surface close to a side wall along which the vehicle is moved. The free end is preferably flexible to adapt its shape to the surface of the side wall and/or the floor surface next to the side wall.

In an embodiment, the at least one skid element is a plate or strip shaped element. Plate or strip shaped elements, for example plate shaped elements having a substantially rectangular shape are suitable to form skid elements to slide over a floor surface. A front bottom corner of the plate shaped element may be rounded off to avoid that the front bottom end is caught by irregularities in the floor surface over which the skid element slides.

In an embodiment, the vehicle is a manure removal vehicle comprising:
  a tank for storing manure, the tank having a manure inlet opening, and
  a vacuum pump which is configured to supply a reduced pressure, i.e. a vacuum, to the tank,
wherein the manure inlet opening is situated in front of the floor-scraping device and is at least partly surrounded by the floor-scraping device to form a manure collection space.

The vehicle of the invention may be a manure removal vehicle configured to collect manure and suck it into a tank of the vehicle, which allows good control over the manure, and prevents unnecessary spreading of manure over other parts of the floor. The vehicle may also be used to scrape manure over a floor surface, for instance on a stable floor having slot shaped floor openings to discharge manure to an underlying manure container.

In a manure removal vehicle having a tank to collect manure, a volumetric centre of the tank may be arranged substantially above the axis of rotation of the wheels of the vehicle such that the mass of manure in the tank is mainly carried by the wheels of the vehicle. As a result, the force on the skid elements is substantially independent of the quantity of manure in the tank. In this way the force with which the skid elements are forced on the floor surface is more constant and can be optimized for the skid elements to slide over the floor surface and/or the floor-scraping device to clean the floor surface.

It is desirable that the manure can be sucked into the tank with a relatively small under pressure, or vacuum, in the tank. This can be realized by creating a pool of manure below the manure inlet opening such that the manure inlet opening is substantially filled with, or covered by, manure. To create such a pool of manure, a manure collection space can be provided in which the manure can be collected. Such a manure collection space is at least formed by the floor scraping device, but the one or more skid elements may be used to delimit, together with the floor-scraping device, the manure collection space in which manure may be collected to form a supply of manure that can be sucked into the tank.

In an embodiment with two skid elements, the skid elements may form sides of the manure collection space, while the floor-scraping device forms a rear of the manure collection space.

In an embodiment, the manure inlet opening comprises a circumferential wall projecting into the manure collection space. By providing the manure inlet opening with a circumferential wall that projects into the manure collection space, the manure inlet opening is a tube shaped element configured to be dipped into the manure pool created in the manure collection space. The manure inlet opening will more easily be filled with manure which makes sucking manure into the tank with a relatively low pressure more efficient.

The circumferential wall may be formed by a separate element, but may also be partially formed by the floor scraping device.

In an embodiment, the circumferential wall forms a tube shaped element projecting downwards to substantially the same height as or slightly higher than the slide surface of the at least one skid element, and wherein at least a front side of the circumferential wall is made of flexible material. By extending the tube shaped element downwards from the manure inlet opening to substantially the same height as the slide surface of the at least one skid element, or slightly above it, a relatively small pool of manure is required in the manure collection space to effectively cover the manure inlet opening. This may in particular be useful when the manure has a low viscosity and will easily flow out of the manure collection space.

To facilitate the sucking up of solid manure or high viscosity manure, such as chunks of manure, at least a front side of the circumferential wall is made of flexible material. The flexible part of the circumferential wall should be dimensioned such that the flexible part cannot block the manure inlet opening. For example, the height of the flexible part should not exceed the width of the manure inlet opening. Further, the bottom front edge of the tube shaped element may have notches, for example by providing a serrated bottom front edge.

In an embodiment, a rear part of the circumferential wall, i.e. the part closer to the floor scraping device, may project further downwards than a front side part of the circumferential wall. This will facilitate the entering of the manure into the tube shaped element.

In an embodiment, near to the at least one skid element at least one additional skid element is provided. In some floor surfaces, such as stable floors, floor openings may be provided in the floor surface. For example, stable floors may have slot shaped floor openings to discharge manure to an underlying manure container. Such floor opening may have a shape capable to receive a skid element in the floor opening. When a skid element would fall into such floor opening, the vehicle may get stuck and/or the vehicle may be damaged. To avoid that a skid element can fall into a floor opening, an additional skid element may be provided to support the front side of the vehicle when the skid element is arranged above such floor opening. Herein, "near" is intended to mean, in the case of two or more skid elements, "nearer to the relevant one of the skid elements than to any other of said skid elements".

Each additional skid element is associated with a skid element, wherein the elongate slide surfaces of the additional skid element(s) is(are) arranged parallel to a slide surface of the associated skid element or at an angle with respect to the associated skid element. The angle ensures that, when a skid element is received in a floor slot, the additional skid element will be at an angle with said slots and thus not fall into such slots.

The distance between the additional skid elements and the associated skid elements may be smaller than a length of the elongate slide surface of the associated skid element. In such embodiment, the additional skid element and the associated skid element may be arranged relatively close to each other. A distance between the additional skid element and the associated skid element may be selected to be different than a distance between two adjacent floor openings, in particular slot shaped floor openings, in a stable floor, or a multiple thereof, such that the additional skid element and the associated skid element cannot simultaneously fall into floor openings of the stable floor.

In embodiments, the at least one additional skid element is provided with at least a flexible lower skid rim, and/or is shorter than the skid element near to which it is provided.

Such a flexible lower skid rim provides similar advantages as described above for the skid element. Furthermore, since the additional skid element need support the vehicle only a fraction of the time, it suffices if they are shorter than the "main" skid element(s).

In an embodiment, the two skid elements or at least the slide surfaces thereof are made of hard plastics material, in particular of polyurethane.

In an embodiment, the floor-scraping device is at least partly curved and open to the front, when viewed in the intended direction of travel. This shape promotes the transportation of manure towards the manure inlet opening, where e.g. it can be sucked up in the tank of the vehicle.

In the invention, at least the lower rim of the floor-scraping device is made of a flexible material. For example, the floor scraping device may comprise a flexible floor scraping element, for example a strip of material, which is held in a rigid holding device to hold the strip at a top end thereof.

In an embodiment, front side corners of the vehicle are provided with slide blocks to allow the vehicle to slide along a side wall. The slide blocks can be made of material that facilitates sliding of the slide blocks along a side wall. The slide blocks may for example be made of plastics material, such as high-density polyethylene (HDPE) or polyurethane (PUR), or other suitable materials. The slide blocks preferably have a smooth surface.

In an embodiment, each slide block comprises a side surface to contact a side wall, wherein the side surface comprises:
a slide section substantially perpendicular to the axes of the wheels, and a redirect section adjacent to and in front of the slide section and having a curved shape, wherein the slide section is configured to guide the vehicle along the side wall in a direction substantially parallel to the side wall, and wherein the redirect section has a curved shape configured to redirect the vehicle into a direction substantially parallel to the side wall when the vehicle is driven with the redirection section against the side wall.

The slide section is used to guide the vehicle along a side wall when the vehicle moves substantially parallel to the side wall. The redirect section is used to redirect the vehicle when the vehicle drives against the side wall at an angle. To make redirection of the vehicle possible, the angle with which the vehicle drives against the side wall must not be too large, in particular smaller than a predetermined non-right angle. The redirection section may for example be configured to redirect the vehicle when it is driven against the side wall with an angle of maximally 30 degrees with respect to the slide section. The redirect section preferably has a large radius such that the surface of the redirection section between 0 and 30 degrees with respect to the slide section is relatively large so that the vehicle can easily be driven with the redirection section towards the side wall. The large surface also has the advantage that the vehicle can be smoothly redirected to a direction substantially parallel to the side wall.

In an embodiment, the side surface further comprises a bump section to bump into a side wall when the vehicle is driven against the side wall with a relatively large angle. When the vehicle is driven with a relatively large angle against the side wall, i.e. larger than the maximal angle of the redirect section, the vehicle will bump into the side wall. To absorb this bump into the side wall, the slide block may comprise a bump section such that the vehicle is not damaged.

In an embodiment, the side surface further comprises a positioning section configured to cooperate with a fixed positioning frame of a docking station configured to receive the vehicle to position the vehicle with respect to the positioning frame.

A manure removal vehicle may be required to dock in a docking station, for example to charge a battery and/or to dump manure from a manure collection tank. To properly dock the vehicle in the docking station, the vehicle must be aligned with the docking station. The docking station may therefor be provided with a fixed positioning frame, and the vehicle may be provided with positioning elements to cooperate with the positioning frame to properly align the vehicle with the positioning frame. Since the slide blocks are provided at the front corners of the vehicle, the slide blocks may advantageously be used to provide these positioning elements. For example, the positioning frame may have two docking station positioning elements that mate with the positioning elements of the slide blocks.

In an embodiment, a top side of each of the slide blocks is chamfered. When the machine and in particular the scraper and the slide blocks move in contact with a wall, a portion of the wall will be cleaned. The wall, which for example may be a wall or the entry edge of a resting box in a dairy stable, may be higher then the slide block, and thus a layer of manure in the area not reached by the slide block and scraper remains on a side wall. Over time, a type of channel may be created, with the top wall being manure on the wall and the bottom wall being the floor, the slide block travels along the channel. The chamfered top side of the slide blocks allows the front side of the vehicle (with slide blocks) to be moved slightly upwards. This is needed for example when the vehicle will change driving direction and the floor scraping device will switch in bending direction, or when the vehicle backs up. Without the chamfered edge, the channel might prevent such upwards movement. To make it possible for the vehicle to move upwards, the top side of each of the slide blocks is be chamfered such that the chamfered top side pushes the slide block sidewards at least partly out of the channel therewith making the upwards movement possible.

In an embodiment, a height of the at least one skid element is adjustable to adapt an extent with which the lower rim of the floor-scraping device extends downwards beyond the lower side of the skid elements. By adjustment of the height difference between the lower end of the floor-scraping device and the lower end of the skid elements, the functioning of the floor-scraping device can be further optimized. A smaller distance may decrease the friction of the floor-scraping device on the floor surface, but a larger distance may improve the cleaning effect of the floor-scraping device, in particular the ability of the floor-scraping device to adapt its shape to the irregularities of the floor surface.

It is remarked that prior art manure removal devices typically comprise movable parts to determine whether the vehicle is close to a side wall and/or to guide the vehicle along the side wall. These movable parts for instance include a side wall sensing wheel or contact sensors arranged at the side of the vehicle in order to determine whether the vehicle is relatively close to a side wall. Although these movable parts may be effectively used, the movable parts may occupy considerable space and/or may be susceptible for malfunctioning caused by contamination in the severely soiled environment of stables and the like. Since the vehicle is used to remove manure, the movable parts will become covered with manure which may result in this malfunctioning.

In view thereof, the invention further provides a vehicle as claimed in claim 18, in particular a self-propelled manure removal vehicle, comprising at least two wheels, at least one motor device and a control device, for displacing the vehicle in a desired direction of travel by driving at least one of the wheels, and a floor-scraping device configured to clean a floor surface while being in contact with the floor surface, wherein front side corners of the vehicle are provided with slide blocks to allow the vehicle to slide along a side wall.

The provision of slide blocks allows the vehicle to slide along a side wall without the need of providing movable parts. The advantage of the slide blocks is that the vehicle can be driven against the wall at a small angle and as a result of the sliding of the slide blocks along the side wall the vehicle may follow the wall without the need of further sensors or correction devices.

Furthermore, the slide blocks occupy relative little space. This leaves more space for the other parts of the vehicle, for example a tank to collect manure. Also, since no moving parts are required, the system is less susceptible for malfunctioning.

The slide blocks may have the additional features of claims 14-16.

Embodiments of an autonomous vehicle according to the invention will now be described in further detail, by way of example only, with reference to the accompanying drawings in which.

Figure 1:
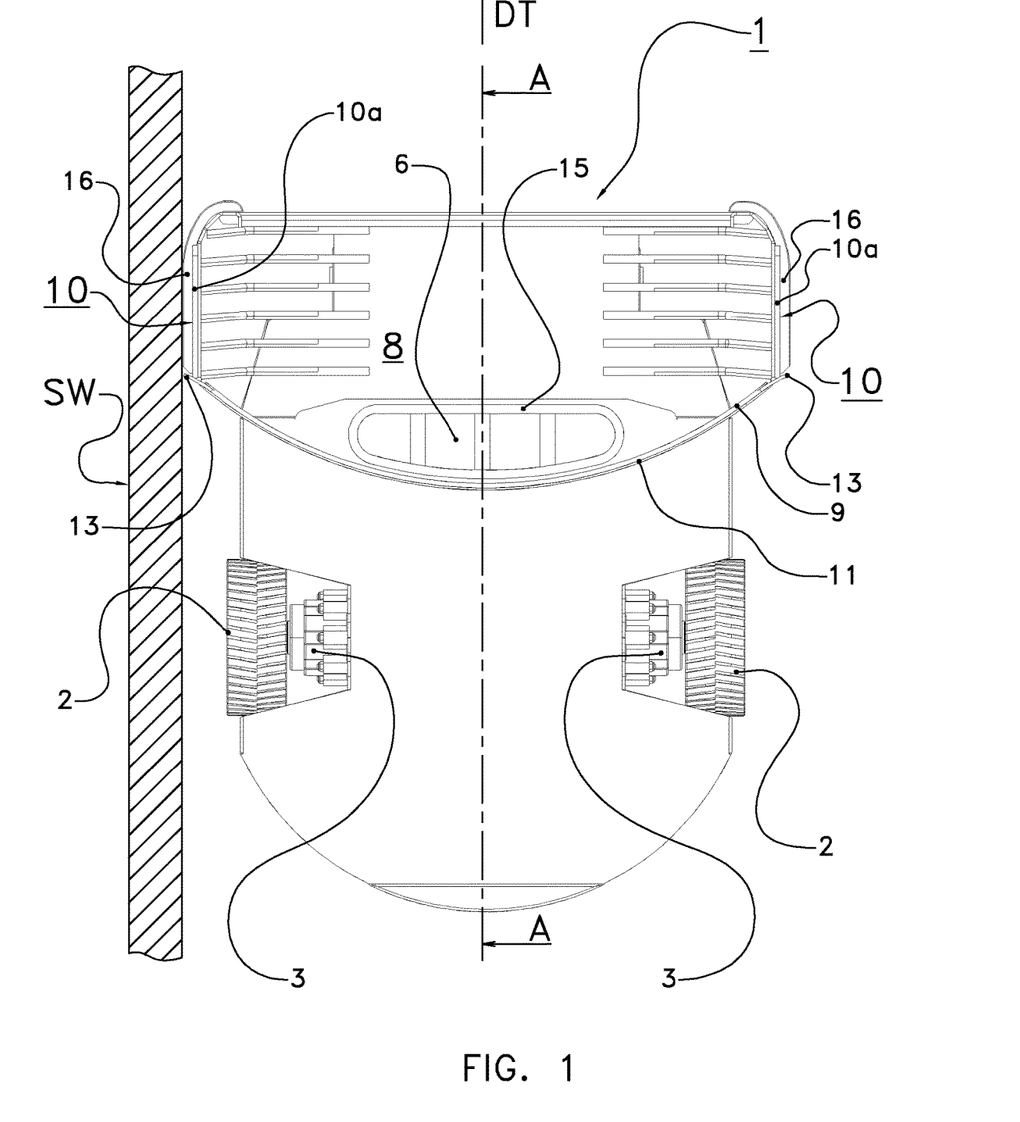
FIG. 1 shows a bottom view of a vehicle according to an embodiment of the invention.
Figure 2:
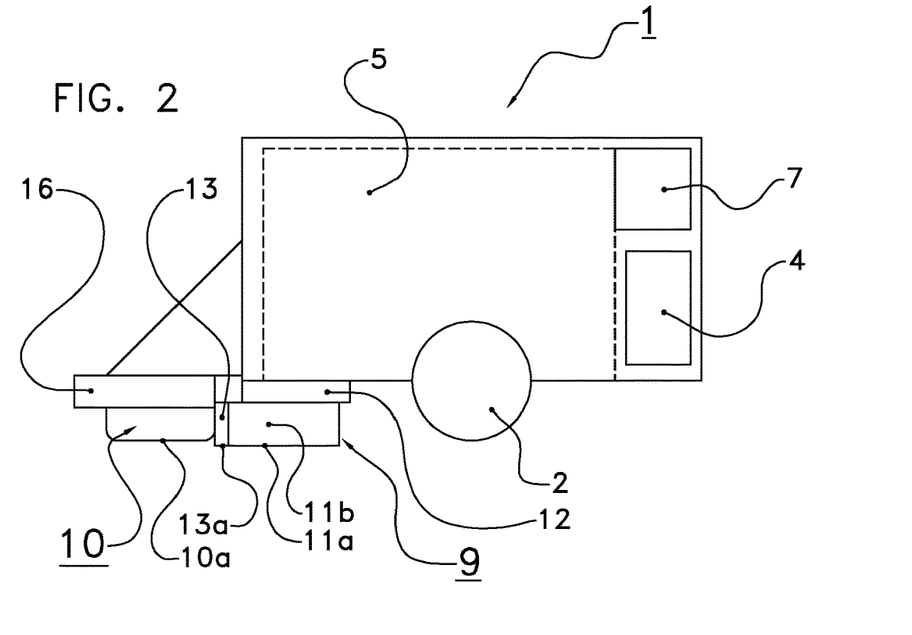
FIG. 2 shows a schematic side view of the vehicle of FIG. 1.

FIG. 1 shows a bottom view of an unmanned vehicle generally indicated by reference numeral 1. FIG. 2 shows schematically a side view of the vehicle 1. The vehicle 1 is an unmanned self-propelled manure removal device, which can move autonomously over a floor surface, in particular a stable floor.

The vehicle comprises two wheels 2, each comprising a motor device 3, for example a rotary electromotor to drive the respective wheel 2. A control device 4 is provided to actuate the two motor devices 3. The direction of movement of the vehicle 1 can be adapted by driving the wheels 2 at different wheel speeds or motor torque settings, or possibly in different directions (when steerable wheels are provided). In this way the vehicle 1 can be moved over the floor surface. The intended main direction of travel of the vehicle 1 is indicated by arrow DT.

The vehicle 1 may comprise different sensors to determine a position and location of the vehicle within the area in which the vehicle operates. These sensors may for example include ultrasonic, optical distance sensors and gyroscopic sensors.

Information on the movement of the vehicle 1 may also be obtained from the motor devices 3. For example, an increased torque level delivered by the motor devices 3 and decreased or zero vehicle speed may indicate that the vehicle 1 is blocked by an obstacle.

The vehicle 1 further comprises two encoders each associated with the one of the motors driving the wheels to determine the number of revolutions of each of the wheels 2. The number of wheel revolutions together with the known wheel diameter are used to determine the distance of travel covered by each of the wheels 2 and thus of the vehicle. The encoders may be hardware encoders or software encoders. Hardware encoders are sensitive to dirt, software encoders are stable and base the number of revolutions on pulses observed from the motor rotor flux.

The vehicle 1 can be programmed to navigate according to a programmed route over the floor surface. The sensors can be used to determine whether the programmed route is followed and whether any unexpected obstacles are encountered during this route of movement. Obstacles such as walls may also be used as expected obstacles and thus confirmation of the location of the vehicle on the route. Other types of navigation using other localisation methods such as SLAM (simultaneous localisation and mapping) or assisted SLAM where a start-up map is provided, may also be used. The vehicle may also be configured to autonomously decide on the route to be followed. Any other way of automatically controlling the movement of the vehicle 1 over a floor surface may also be used.

The vehicle 1 comprises a tank 5 for storing manure. The volumetric centre of the tank 5 is arranged above the axis of rotation of the wheels 2 so that the weight of the manure collected in the tank is mainly carried by the wheels 2.

The tank 5 comprises a manure inlet opening 6 to allow manure to enter into the tank 5. A vacuum pump 7 is connected to the tank 5 to create an under pressure or partial vacuum in the tank 5 so that manure can be sucked through the manure inlet opening 6 into the tank 5.

A manure collection space 8 is delimited by a floor scraping device 9 and two skid elements 10. In use of the machine, this manure collection space 8 collects, while the machine drive over the floor surface, a quantity or buffer of manure which forms a pool of manure below the manure inlet opening 6. The pool of manure in the manure collection space and formed below the manure inlet opening effectively fills or covers the area surrounding the manure inlet opening 6 such that no air is sucked into tank 5 and thus only a relatively small under pressure is required in the tank 5 to effectively transport manure through the manure inlet opening 6 into the tank 5.

The floor scraping device 9 is configured to scrape over the floor surface to collect manure from the floor surface. At least the lower rim of the floor scraping device 9 is formed of flexible material capable of adapting its shape to the floor surface. In the shown embodiment, the floor scraping device 9 comprises a floor scraping element 11 having bottom surface 11a and a lower scraping rim 11b. The floor scraping element 11 may be of a wear resistant but flexible material, such as preferably a rectangular plate-shaped element made of polyurethane material, which element is held in a rigid holding device or scraper frame 12. The thickness of the polyurethane material is selected such that the material provides sufficient flexibility to adapt its shape, and in particular the shape of the lower scraper rim 11b, to the floor surface.

The floor scraping device 9 has a curved concave shape and passes behind the manure inlet opening 6. The skid elements 10 likewise are rectangular plate-shaped elements of polyurethane material, and comprise a lower skid rim and an elongate bottom or slide surface 10a. As shown in FIG. 1, the skid elements 10 extend substantially perpendicular to the axes of the wheels of the vehicle. The slide surface 10a is configured to slide over the floor surface when the vehicle moves over the floor surface in the direction of travel DT as shown in FIG. 1. The front end of the slide surface 10a is rounded off to reduce the risk of the skid element being caught on a irregularity of the floor surface. The skid elements 10 are mounted to the vehicle by skid mounting frame 19.

The skid elements 10 are relatively stiff when the vehicle moves in the forward direction (depicted in FIG. 1 as direction of travel DT), as compared to the floor-scraping element 11 which when the vehicle moves in the same direction DT will flex to follow the floor surface, and form front support devices of the vehicle 1. As can be seen in FIG. 2, the floor-scraping element 11 projects in downward direction beyond a bottom end of the skid elements 10. i.e. beyond the slide surface 10a. The skid elements 10 can also be made from polyurethane plate material, and the thickness of the skid elements 10 may be larger to increase the rigidity of the skid elements 10 compared to the rigidity of the floor-scraping element 11.

Figure 3:
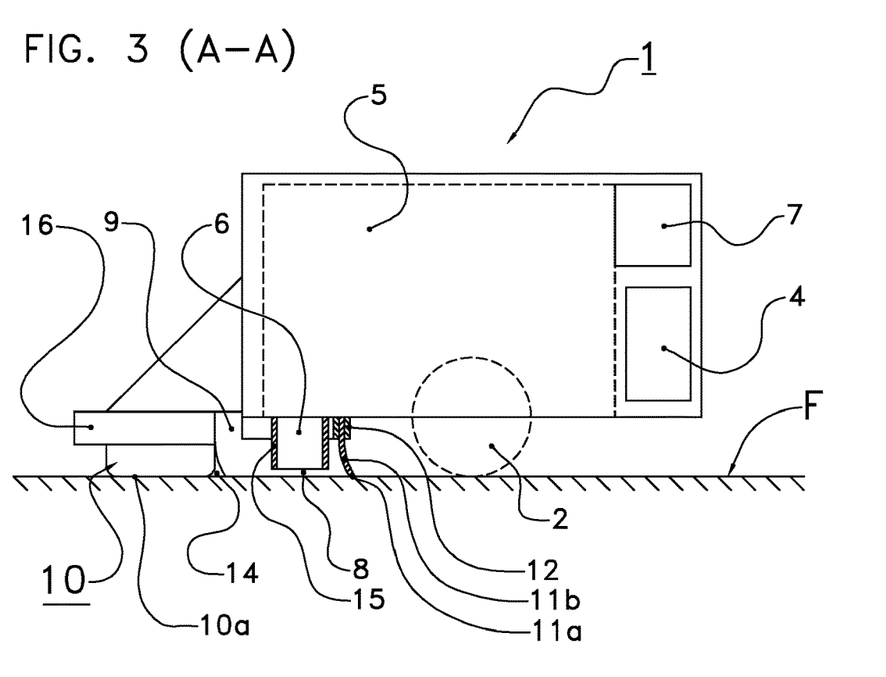
FIG. 3 shows a schematic cross section of the vehicle of FIG. 1 along the line A-A.

FIG. 3 shows a cross-section A-A of the vehicle 1 of FIGS. 1 and 2. FIG. 3 shows how the front side of the vehicle 1 is supported by the skid elements 10 on a floor surface F. The vehicle 1 is balanced such that the front side is arranged with sufficient pressure on the floor surface F in a working and/or loaded state. In the working and/or loaded state the lower rim 11b of the floor scraping element 11 is flexed and the effective height of the floor scraping element is reduced, such that the front side of the vehicle 1 is supported on the skid elements 10. When the vehicle moves forward in the floor-scraping element 11 scrapes over the floor surface in this flexed state. In this flexed state, the floor-scraping element 11 adapts it shape to the floor surface. For example, the flexible material of the floor-scraping element 11 be locally be slightly pushed upward by stones, rims or uneven floor elements, or may extend into dents, holes and other irregularities in the floor surface F. This allows for good scraping and collecting of the manure by the scraper and thus in better cleaning of the floor surface F.

To maximize the size of the manure collection space 8, the skid elements 10 are mounted to the vehicle adjacent the floor scraping element 11, more in particular adjacent the free ends 13 of the floor scraping element. The free ends 13 of the floor scraping element 11 extend beyond the respective skid element 10. The skid elements 10 abut the floor scraping element 11. This scraping element end 13 is arranged at a side of the vehicle and is configured to scrape along a side wall SW (See FIG. 1) such that the side wall SW and/or the floor surface directly next to the side wall SW is effectively cleaned by the floor-scraping device 9.

It is remarked the scraping element end 13 includes an vertical end and a bottom surface 13a, which together form a corner which is shaped to facilitate scraping the transition between the side wall SW and the floor surface F. In the embodiment shown in FIG. 2, the front bottom corner of the end 13 comprises an angle of 90 degrees to scrape the rectangular shaped transition between the side wall SW and the floor surface.

The manure scraped by the scraping element end 13 may be transported to the manure collection space 8 through an opening 14 which comes into existence between one of the skid elements 10 and the floor scraping device 9 when the floor scraping element is in its flexed state as shown in FIG. 3.

The manure inlet opening 6 comprises a circumferential wall 15 extending into the manure collection space 8. The circumferential wall 15 forms a tube shaped element having the cross section of the manure inlet opening 6. As described above, in use this manure collection space 8 collects, while the machine drive over the floor surface F, a quantity of manure which forms a manure buffer below the manure inlet opening 6. Since the circumferential wall extends into the manure collection space, the circumferential wall 15 forms a chamber which will in principle be filled with manure. The manure will remain in the chamber when the vehicle stops moving, and can be dumped when the inlet 6 and circumferential wall 15 are positioned over an opening such as an inlet of a manure cellar at a dumping station. Thus the manure buffer surrounds the circumferential wall 15. The manure buffer can increase or decrease, as the vehicle operates, without the consistent performance of the sucking function being disturbed by air leaking into the manure inlet. Manure from the buffer in the collection space 8 flows underneath the circumferential wall 15 into the chamber formed by the circumferential wall 15. The circumferential wall 15 has the particular advantage that its flexibility can be chosen with great freedom without being hindered by specific requirement of the scraper. Typically the circumferential wall may be much more flexible then the scraper because the circumferential wall 15 does not need to scrape. The circumferential wall 15 can be made from a polyurethane having a Shore A value in the medium soft range such as between 35-55, and the scraper element preferably is made from Polyurethane having Shore A value in the a medium hard range such as between 60 and 80. The circumferential wall 15 is mounted to the manure inlet opening 6, and extends down such that it will at least a lower rim will be surrounded by the pool of manure formed in the manure collection space 8 when the vehicle is in use. As explained above by ensuring filling of the manure inlet opening 6, and preventing air leakage into the manure inlet opening, the system allows the use of a relatively low under pressure in the tank 5 to effectively transport or suck manure into the tank 5.

The tube shaped element formed by the circumferential wall 15 may have a length such that a bottom end of the tube shaped element is arranged at substantially the same height as the slide surface 10a of the skid elements 10, or slightly above it. In FIG. 3 it is shown to be slightly above the slide surface 10a of the skid element. This is advantageous since only a relative small pool of manure is required to cover the manure inlet opening 6. In such embodiment, at least the front side of the circumferential wall 15, but preferably the whole wall 15, is flexible to allow chunks of manure into the tube shaped element.

The vehicle 1 is in particular configured to collect manure in an animal stable. In such animal stable side walls formed by small or larger walls are present. The vehicle 1 should be suitable to clean the floor surface of the animal stable up to the side walls SW. As explained above, the vehicle is provided with a floor-scraping device 9 having a scraping element end 13 configured to be moved along the side wall SW to clean the side wall SW and/or the floor surface directly next to the side wall SW.

To clean the side wall and the floor surface directly next to the side wall SW and/or the floor surface directly next to the side wall SW, the vehicle should be driven closely along the side wall SW. Driving closely along a wall is generally called 'wall following' and in prior art vehicles 1 different solutions have been proposed for wall following, wherein mechanical contact devices having movable parts are used to allow the vehicle to move closely along the side wall SW.

According to an aspect of the invention, the front side corners of the vehicle 1 are provided with slide blocks 16 to allow the vehicle 1 to slide along a side wall SW. These slide blocks 16 obviate the need for mechanical contact devices having movable parts to allow the vehicle 1 to move along the side wall SW.

The advantage of slide blocks 16 is that the slide blocks 16 occupy little space in the vehicle 1 and the slide blocks 16 do not have any movable parts that are used to detect or follow the side wall SW. As a result, a robust system is obtained to follow a side wall of a floor surface to be cleaned.

The vehicle 1 may be controlled in such a way that the vehicle 1, when moving along a side wall SW is continuously pressed against the side wall, for example by driving the wheel 2 which is father from the side wall with more torque than the wheel 2 closer to the side wall. Since one of the slide blocks 16 will be pressed against the side wall SW, the slide block 16 will touch the side wall SW and slide along the side wall SW.

The slide blocks 16 are curved, in particular rounded off at the front side corners of the vehicle 1 to reduce the chance that the front side corners of the vehicle 1 are caught by a rim or other irregularity of the side wall SW.

Furthermore, the surface of the slide blocks 16 that may contact the side wall SW is provided with a smooth surface to enhance sliding of the slide blocks 16 along the side wall SW. The slide blocks 16 are for example made of wear resistant plastics material, such as high-density polyethylene or polyurethane. A lubricant or other friction reducing compound may be provided on or in the slide blocks 16 to enhance the sliding characteristics of the slide blocks 16.

In practice, sliding of the slide blocks 16 along a side wall in an animal housing occupied with animals, typically forms a film of manure on the side wall. Such film of manure ameliorates the sliding along the slide wall, and reduces the wear of the slide blocks 16. The end 13 of the scraping element 11 extends sideways a little bit, such as e.g. 5 mm beyond the side blocks 16, in order for the scraper to be able to contact the side walls.

Figure 5:
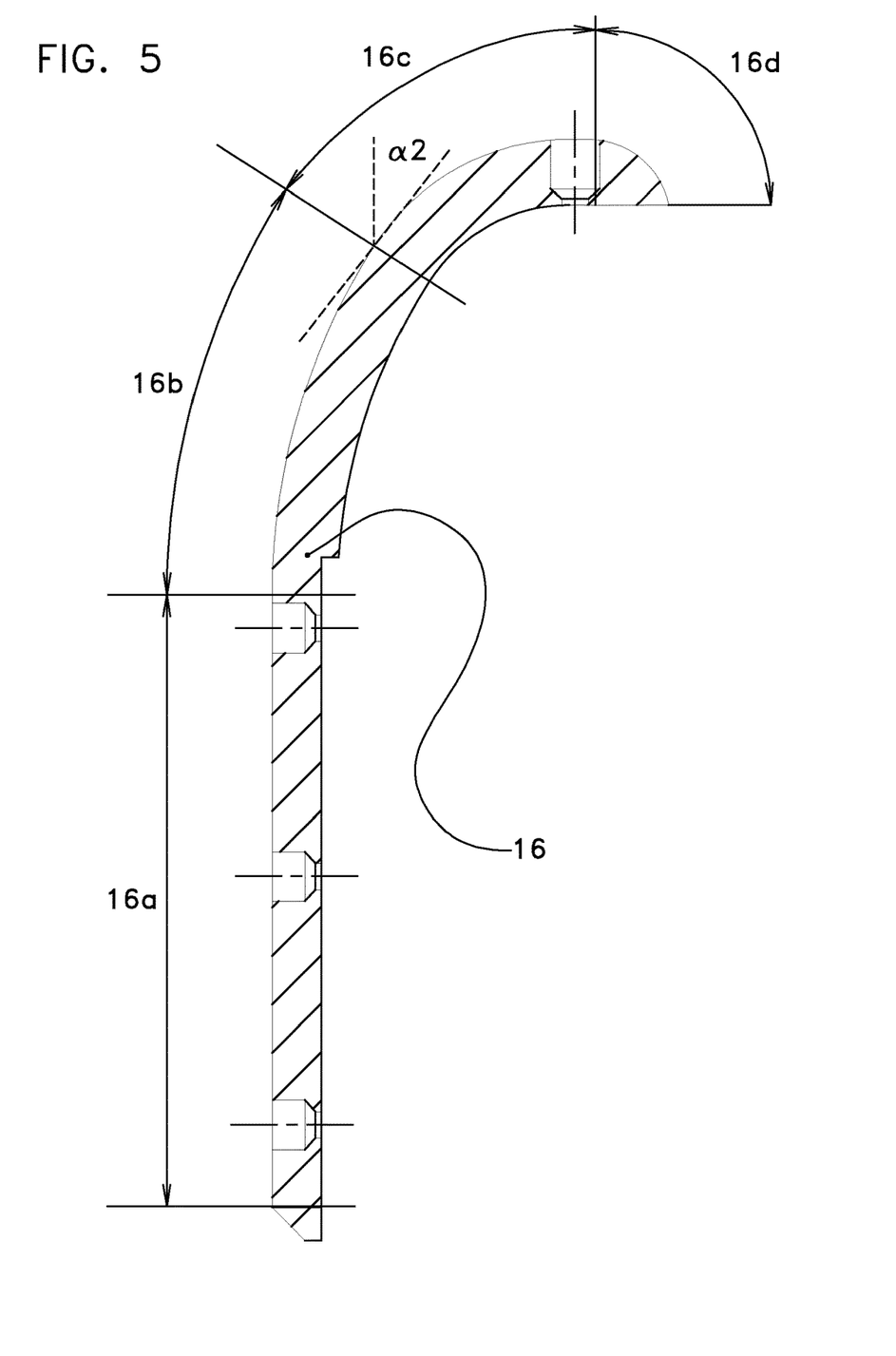
FIG. 5 shows a top view on a slide block according to an embodiment of the invention.

FIG. 5 shows a top view of the slide block 16. The slide block 16 comprises four sections; a slide section 16a, a redirect section 16b, a bump section 16c and a positioning section 16d.

The slide section 16a is substantially parallel to a longitudinal plane of the vehicle and configured to guide the vehicle 1 along the side wall SW in a direction substantially parallel to the side wall SW, as shown in FIG. 1.

The redirect section 16b is adjacent to and in front of the slide section 16a. The redirect section 16b comprises a curved shape and is configured to redirect the vehicle to a direction substantially parallel to the side wall SW when the vehicle 1 is driven with the redirection section against the side wall at an angle. During redirection the surface of the redirect section will slide along the side wall SW. Redirection of the vehicle 1 is only possible when the angle with which the vehicle drives against the side wall is not too large. The redirection section 16b is configured to redirect the vehicle 1 when it is driven against the side wall SW with an angle α of maximally 30 degrees with respect to the slide section 16a.

The redirect section 16b has a large radius such that the surface of the redirection section between 0 and 30 degrees is relatively large. This large surface has the advantage that the vehicle 1 can smoothly be redirected to a direction substantially parallel to the side wall. Also the large surface facilitates driving of the vehicle with the redirect section 16b against the side wall SW.

The bump section 16c is configured to absorb bump forces when the vehicle 1 is bumped into a side wall SW, when the vehicle is driven against the side wall with a relatively large angle.

Finally, the positioning section 16d is configured to cooperate with a fixed positioning frame of a docking station associated the vehicle.

The vehicle 1 may be required to dock in a docking station (not shown), for example to charge a battery and/or to dump manure from the manure collection tank 5. To properly dock the vehicle 1 in the docking station, the vehicle 1 must be aligned with the docking station. The positioning sections 16d of the slide blocks 16 are configured to mate with positioning frame of the docking station such that the vehicle 1 can properly align with the docking station by mechanical contact between the positioning frame and the positioning sections 16d.

Figure 4:
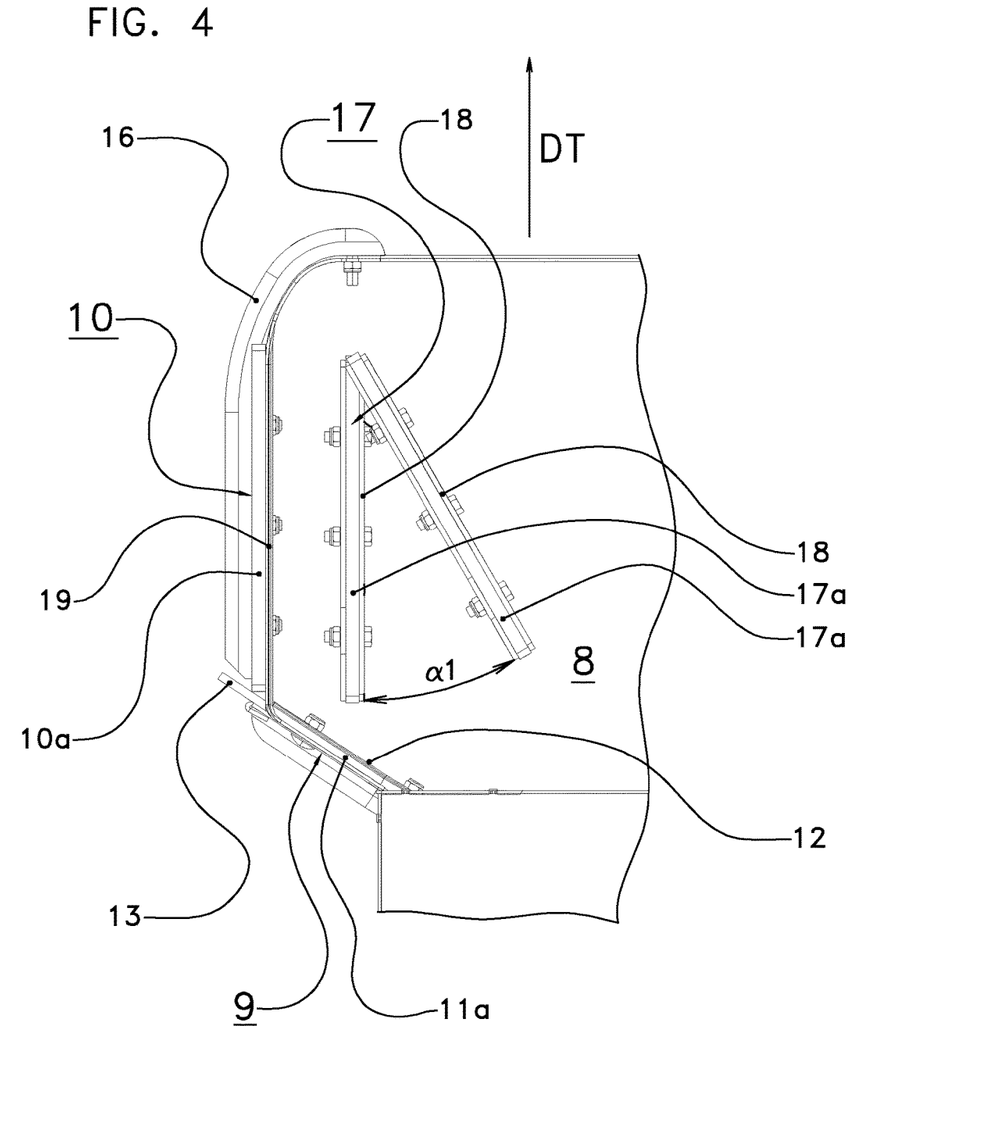
FIG. 4 shows a detail of a bottom view of a vehicle of the invention according to a second embodiment.

FIG. 4 shows a bottom view of a part of a front side corner of an alternative embodiment of a manure removal vehicle 1.

Next to the skid element 10, an additional skid element 17 is provided. The additional skid element 17 comprises an elongate slide surface 17a and is mounted to the vehicle by additional skid frame 18. The additional skid element is an element which is plate shaped like skid element 10 and arranged substantially parallel it, in particular the sliding surface 17a is arranged substantially parallel to the elongate slide surface 10a of the skid element 10. The distance between the skid element 10 and the additional skid element 17 is selected such that this distance is different than a distance, or a multiple thereof, between two adjacent slot shaped openings provided in the stable floor for manure discharge to an underlying manure container. As a result, the chance that the skid element 10 and the additional skid element 17 at one side of the vehicle 1 are simultaneously aligned with such slot shaped opening is substantially reduced. In this way the risk of the vehicle getting stuck in the slot shaped openings is also reduced.

The skid element 10 and the additional skid element 17 may be mounted in a common frame extending in a substantially horizontal direction.

The sliding surface 10a of the skid elements 10 and the sliding surface 17a of the additional skid elements 17 may be arranged at the same height, but, in an alternative embodiment, the sliding surface 17a of the additional skid elements 17 may also be arranged slightly higher than that of the skid elements 10.

The manure entering the manure collection space 8 between the skid element 10 and the additional skid element 17 may be transported towards the manure inlet opening 6 through the space between the floor-scraping device 9 and the additional skid element 17.

The additional skid element 17, and in particular its elongate slide surface 17a, may also be arranged at an angle of for example 5-40 degrees with respect to the slide surface 10a of the skid element 10. This better facilitates manure being transported toward the inlet opening, while not negatively effecting the sliding properties of the skid element. In an alternative embodiment the front ends of skid element 10 and skid element 17 may abut, while maintaining the angle.

At the opposite side of the vehicle 1, i.e. near the opposite skid element 10 also an additional skid element 17 having an elongate slide surface 17a is provided.

1 vehicle
2 wheel
3 motor device
4 control device
5 tank
6 manure inlet opening
7 vacuum pump
8 manure collection space
9 floor scraping device
10 skid element
10a slide surface of skid element
11 floor scraping element
11a bottom surface of scraping element
11b lower rim of scraping element
12 mounting frame for floor scraping element 11, holding device
13 scraping element end
13a bottom surface of the scraping element end
14 opening
15 circumferential wall
16 slide block
16a slide block—slide section
16b slide block—redirect section
16c slide block—bump section
16d slide block—positioning section
17 additional skid element
17a slide surface of additional skid element
18 mounting frame additional skid element 17.
19 mounting frame for skid element 10
DT direction of travel
F floor surface
α maximum redirection angle
α1 angle between skid element 10 and additional skid element 17

The invention claimed is:

1. An autonomous self-propelled manure removal vehicle, comprising:
   at least two wheels each having an axis of rotation, at least one motor device and a control device, for displacing the vehicle by driving at least one of the wheels;
   a floor-scraping device including at least a flexible lower scraper rim to adapt its shape to a floor surface, the floor-scraping device being configured to clean, in a working state of the vehicle, the floor surface while being in contact with the floor surface;
   at least one skid element including at least a flexible lower skid rim with a slide surface to slide over the floor surface to support the vehicle in the working state of the vehicle, the at least one skid element being elongate and extending substantially perpendicular to the axes of the wheels; and
   wherein the lower scraper rim of the floor scraping device in a non-loaded and non-working resting state of the vehicle extends further downwardly than the slide surface of the at least one skid element,
   wherein the vehicle further comprises slide blocks which are fixedly secured at front side corners of the vehicle to allow the vehicle to slide along a side wall,
   wherein each slide block comprises a side surface to contact a side wall, wherein the side surface comprises:
   a slide section substantially perpendicular to the axes of the wheels, and
   a redirect section adjacent to and in front of the slide section,
   wherein the slide section is configured to guide the vehicle along the side wall in a direction substantially parallel to the side wall, and
   wherein the redirect section has a curved shape configured to redirect the vehicle into a direction substantially parallel to the side wall when the vehicle is driven with the redirection section against the side wall.

2. The vehicle of claim 1, wherein the lower scraper rim and the lower skid rim are configured to flex independently from one another, or to separate from one another.

3. The vehicle of claim 1, wherein the vehicle comprises two skid elements.

4. The vehicle of claim 3, wherein the two skid elements are configured adjacent to and in front of the floor-scraping device to foul), a manure collection space delimited by the floor-scraping device and the two skid elements.

5. The vehicle of claim 3, wherein the two skid elements are arranged substantially adjacent opposite ends of the floor-scraping device.

6. The vehicle of claim 3, wherein the floor-scraping device projects, at opposite sides of the vehicle, beyond the skid element provided at a respective end of the floor-scraping device.

7. The vehicle of claim 1, wherein the vehicle is a manure removal vehicle comprising:
a tank for storing manure, the tank including a manure inlet opening, and
a vacuum pump configured to supply a reduced pressure to the tank,
wherein the manure inlet opening is situated in front of the floor-scraping device and is at least partly surrounded by the floor-scraping device to form a manure collection space.

8. The vehicle of claim 7, wherein the manure inlet opening comprises a circumferential wall extending into the manure collection space.

9. The vehicle of claim 8, wherein the circumferential wall forms a tube shaped element extending downwards to substantially a same height as or slightly higher than the slide surface of the at least one skid element, and wherein at least a front side of the circumferential wall is made of flexible material.

10. The vehicle of claim 1, wherein near to the at least one skid element at least one additional skid element is provided with a slide surface to slide over a floor surface to support the vehicle in the working state of the vehicle, or with at least a flexible lower skid rim.

11. The vehicle of claim 5, wherein the at least one additional skid element includes at least a flexible lower skid rim, and/or is shorter than the skid element near to which it is provided.

12. The vehicle of claim 11, wherein the at least one additional skid element comprises an elongate slide surface orientated parallel to or at an angle with respect to the associated skid element.

13. The vehicle of claim 1, wherein the side surface further comprises:
a bump section to bump into a wall when the vehicle is driven against the wall with a relatively large angle; and/or
a positioning section configured to cooperate with a fixed positioning frame of a docking station configured to receive the vehicle to position the vehicle with respect to the positioning frame.

14. The vehicle of claim 1, wherein a top side of each of the slide blocks is chamfered.

15. The vehicle of claim 1, wherein a height of the at least one skid element is adjustable to adapt an extent with which the lower rim of the floor-scraping device extends further downwardly than the lower side of the floor-scraping device.

16. A self-propelled manure removal vehicle, comprising:
at least two wheels, at least one motor device and a control device, for displacing the vehicle in a desired direction of travel by driving at least one of the wheels; and
a floor-scraping device configured to clean a floor surface while being in contact with the floor surface,
wherein the vehicle comprises slide blocks which are fixedly secured at front side corners of the vehicle include slide blocks to allow the vehicle to slide along a side wall,
wherein each slide block comprises a side surface to contact a side wall, wherein the side surface comprises:
a slide section substantially perpendicular to the axes of the wheels, or substantially horizontal, and
a redirect section adjacent to and in front of the slide section, wherein the slide section is configured to guide the vehicle along the side wall in a direction substantially parallel to the side wall, and
wherein the redirect section has a curved shape configured to redirect the vehicle into a direction substantially parallel to the side wall when the vehicle is driven with the redirection section against the side wall.

17. The vehicle of claim 1, wherein each slide block is spaced apart from and not connected to other slide blocks.

18. The vehicle of claim 1, wherein the slide blocks are configured to allow the vehicle to follow the side wall without the need for further sensors or detection devices.

19. An autonomous self-propelled manure removal vehicle, comprising:
at least two wheels each having an axis of rotation, at least one motor device and a control device, for displacing the vehicle by driving at least one of the wheels;
a floor-scraping device including at least a flexible lower scraper rim to adapt its shape to a floor surface, the floor-scraping device being configured to clean, in a working state of the vehicle, the floor surface while being in contact with the floor surface;
at least one skid element including at least a flexible lower skid rim with a slide surface to slide over the floor surface to support the vehicle in the working state of the vehicle, the at least one skid element being elongate and extending substantially perpendicular to the axes of the wheels; and
wherein the lower scraper rim of the floor scraping device in a non-loaded and non-working resting state of the vehicle extends further downwardly than the slide surface of the at least one skid element,
wherein the vehicle further comprises slide blocks which are secured at front side corners of the vehicle to allow the vehicle to slide along a side wall, and which slide blocks do not have any moveable parts that are used to detect or follow the side wall,
wherein each slide block comprises a side surface to contact a side wall, and
wherein each slide block is spaced apart from and not connected to other slide blocks.

\* \* \* \* \*